United States Patent

[11] 3,628,143

[72] Inventor Richard G. Di Paola
 Newtown, Conn.
[21] Appl. No. 48,191
[22] Filed June 22, 1970
[45] Patented Dec. 14, 1971
[73] Assignee Curtis Instruments Inc.
 Mount Kisco, N.Y.

[54] REUSABLE MERCURY COULOMETER
 4 Claims, 3 Drawing Figs.
[52] U.S. Cl. .................................................... 324/94,
 324/182, 317/231
[51] Int. Cl. ...................................................... G01r 11/44,
 G04f 11/08
[50] Field of Search............................................. 324/94,
 182; 317/231

[56] References Cited
 UNITED STATES PATENTS
 2,791,473 5/1957 Mattox.......................... 324/182
 3,493,860 2/1970 Corrsin......................... 324/94

*Primary Examiner*—Alfred E. Smith
*Attorney*—Pennie, Edmonds, Morton, Taylor and Adams ABSTRACT: A mercury coulometer is provided with a bore having a capillary central portion and end portions which are sufficiently enlarged that the gravitational force acting on the mercury is sufficient to cause it to penetrate the coulometer electrolyte before the electrolyte reaches the electrical contacts. This feature prevents undesirable chemical reactions between the electrolyte and the contacts and, thus, permits the coulometer to be reused.

FIG. 1
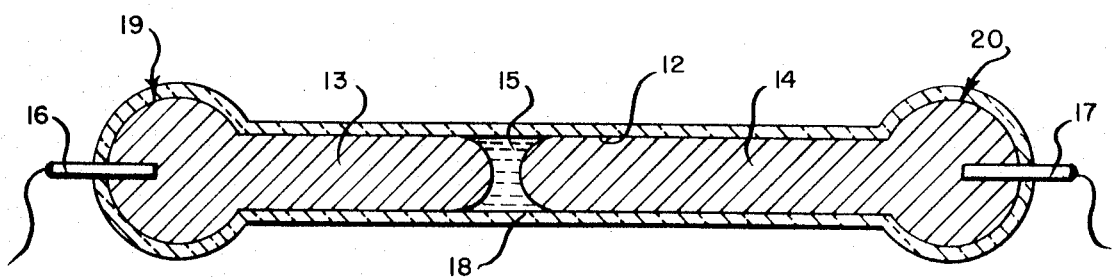
FIG. 2
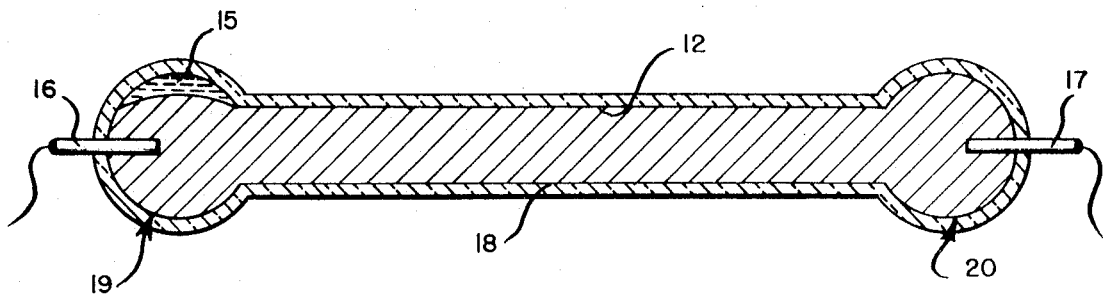
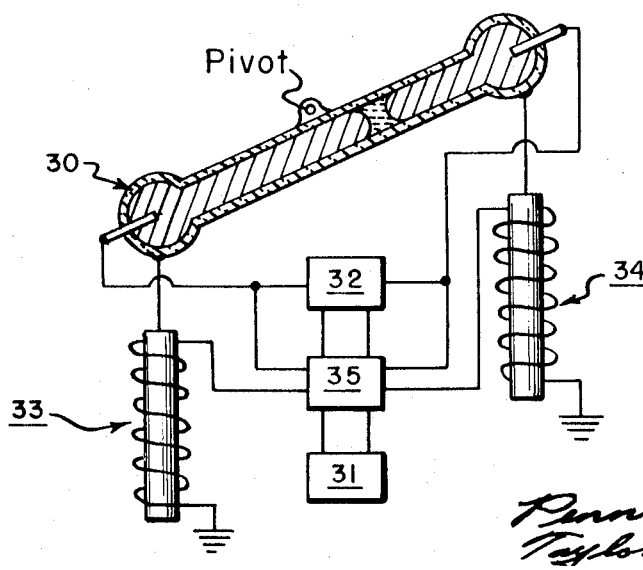
FIG. 3
INVENTOR
Richard G. Di Paola
BY
Pennie, Edmonds, Morton,
Taylor & Adams ATTORNEYS

REUSABLE MERCURY COULOMETER

BACKGROUND OF THE INVENTION

The present invention relates to a reusable mercury coulometer.

The construction and operation of a typical coulometric timing device is described in U.S. Pat. No. 3,045,178 entitled, "Operating Time Indicator" and issued to Lester Corrsin on July 17, 1962. In essence, the device comprises a body of an electrically nonconductive material having a uniform bore therethrough which supports two columns of liquid metal (typically mercury). The adjacent endmost ends of the metal columns are separated by a small volume of liquid electrolyte which maintains them in electrical contact. The diameter of the bore is sufficiently small that the capillary forces acting on the mercury columns are large compared to gravitational and typically encountered inertial forces. The outermost ends of the two metal columns are maintained in contact with suitable conductive leads (typically made of nickel or an alloy of iron and nickel) provided to connect the device to a direct current voltage supply.

In operation, the application of a DC voltage across the device causes metallic ions to migrate from the anode column of liquid metal to the cathode column, decreasing the length of the anode column and elongating the cathode. More specifically, the change in column length is directly proportional to the total electrical charge passed through the device. Thus, the integrated time-current product can be measured, for example, by a direct visual comparison of one column length against a calibrated scale.

These devices, however, can be rendered inoperative if the electrolyte is permitted to reach the end of the bore. Once the electrolyte reaches the electrical contacts, chemical reactions typically occur between the electrolyte and the contacts which significantly increase the resistance of the device and produce undesirable compounds, including gases. Since the coulometers are typically used in apparatus where they are not under constant observation, their usefulness is often ended with the first application.

SUMMARY OF THE INVENTION

In accordance with the invention, a coulometric device is provided with a nonconducting bore having end portions which are sufficiently enlarged that the gravitational force acting on the mercury is sufficiently great to cause it to penetrate the electrolyte and short out the coulometer before the electrolyte reaches the electrical contacts. In addition, the volume of the expanded end portions is sufficiently great that the electrolyte can remain as a globule of liquid at the top of the enlarged ends without touching the electrical contacts. By tilting the tube and allowing the globule of electrolyte to run back into the capillary portion of the bore, the coulometer can be reused by applying a voltage of reversed polarity.

BRIEF DESCRIPTION OF THE DRAWINGS

The advantages, nature and various additional features of the invention will appear more fully upon consideration of the illustrative embodiment now to be described in detail in connection with the accompanying drawings:

In the drawings:

FIG. 1 is a cross section of a typical coulometric device in accordance with the invention showing the electrolyte in the capillary portion of the bore;

FIG. 2 is a cross section of the device of FIG. 1 showing the electrolyte in one of the enlarged end portions; and FIG. 3 is a schematic diagram of a mechanism for automatically resetting the device of FIGS. 1-2

DETAILED DESCRIPTION

FIG. 1 shows a coulometric device comprising a tube 11 of nonconductive material such as glass, ceramic, or epoxy resin having a bore 12 extending through it. Two columns 13 and 14 of liquid metal, such as mercury, are disposed in the bore and extend inwardly from opposite ends of the tube. The columns are separated at their inmost ends by a small volume of electrolyte 15 which maintains the two columns in electrical contact. One example of a suitable electrolyte is the water solution of potassium iodide and mercuric iodide described in the previously mentioned patent to Corrsin. Two conductive leads 16 and 17 are provided for making external electrical contact with the mercury. The leads preferably made of a metal, such as nickel, which does not chemically combine with mercury, and the tube is sealed at their entrance by, for example, epoxy resin seals (not shown).

The bore comprises three portions. The interior portion 18 of the bore is a capillary portion of sufficiently small cross section that the capillary forces acting on the mercury and the electrolyte are greater than the gravitational force and the inertial forces to which the device is expected to be exposed in operation. In typical applications, the capillary portion of the bore has a diameter of three millimeters or less and is preferably of circular cross section. The remaining two portions 19 and 20 of the bore are the end portions, preferably spherical bulbs, which are sufficiently enlarged in cross section that the gravitational force acting on the mercury is sufficiently great to cause it to penetrate through the electrolyte when it reaches one of these regions and, thus, to short out the device before the electrolyte reaches the electrical contacts. The expanded portions are of sufficiently large volume compared to the electrolyte that when the electrolyte is forced to the top by weight of the mercury, the electrolyte still does not touch the electrical contacts. This may be seen by reference to FIG. 2 which shows the electrolyte as a globule at the top of one of the expanded portions.

In operation, the application of a DC voltage across the device when the electrolyte is in the capillary portion causes metallic ions to migrate from the anode mercury column to the cathode column, effectively moving the electrolyte towards the anode. When the electrolyte reaches the expanded end portion, the weight of the mercury causes it to penetrate through the electrolyte and short out the device. The electrolyte—which rises to the top of the bubl—can remain at the top without making contact with the electrical contact. The device may then be prepared for reuse by tilting it until the electrolyte is again disposed in the capillary region so that it provides a serial electrical connection between the two mercury electrodes.

FIG. 3 is a diagram of an arrangement for automatically resetting the above-described coulometer comprising, in essence, a pivotally mounted reusable coulometer 30, a current source 31 for moving the electrolyte through the capillary tube of the coulometer, and an electromechanical circuit arrangement for detecting the decreased voltage across the coulometer when the electrolyte reaches an expanded portion of the tube, tilting the coulometer so that the electrolyte is again in the electrical path between the coulometer contacts and reversing the current polarity. This arrangement can conveniently comprise a voltage detector 32 for detecting a decrease in voltage across the coulometer, a pair of solenoids 33 and 34 for tilting the coulometer in opposite angular directions, and a step switch 35 responsive to the voltage detector for activating the solenoids so that the electrolyte is serially disposed in the electrical path between the coulometer contacts, and, at the same time, reversing the polarity of the current source.

Thus, in operation, the electrolyte is moved from left to right, for example, into the expanded portion. The resulting reduction in voltage across the device is detected and the step switch is activated. This switch, in turn, activates the solenoids which tilt the coulometer in the opposite direction. The switch also reverses the polarity of the current source, and the electrolyte moves in the opposite direction until the cycle repeats itself.

It is understood that the above described devices and arrangements are merely illustrative of the many possible specific embodiments which can represent applications of the principles of the invention. Numerous and varied other arrangements can be readily devised by those skilled in the art without departing from the spirit and scope of the invention.

I claim:

1. In a coulometric device comprising a body of nonconductive material having a capillary bore therein, a liquid metal disposed within said bore and an electrolyte for dividing said liquid metal into two columns within said bore and electrical contact means for applying a voltage across said device, the improvement wherein said bore is provided with enlarged end portions of sufficiently greater cross-sectional area than the capillary bore that said liquid metal penetrates said electrolyte before the electrolyte reaches the electrical contacts and of sufficiently great volume that the electrolyte can remain at the top of said enlarged portion without contacting said electrical contacts.

2. A device according to claim 1 wherein said enlarged end portions are spherical.

3. An automatically resetting coulometric device comprising:

A coulometer according to claim 1;

a current source for moving the electrolyte through the capillary tube of said coulometer; and an electromechanical arrangement for detecting the decreased voltage across the coulometer when the electrolyte reaches an expanded portion of the coulometer tube, tilting the coulometer so that the electrolyte is again in the electrical path between the coulometer contacts and reversing the current polarity.

4. A device according to claim 3 wherein said electromechanical arrangement comprises:

a voltage detector for detecting a decrease in voltage across the coulometer;

a pair of solenoids for tilting the coulometer in opposite angular directions; and a step switch responsive to said voltage detector for activating the solenoids in response to a voltage reduction so that the electrolyte is serially disposed in the electrical path between the coulometer contacts and, at the same time, reversing the polarity of said current source.

* * * * *